(12) United States Patent
Lin et al.

(10) Patent No.: US 8,228,074 B2
(45) Date of Patent: Jul. 24, 2012

(54) METHOD AND APPARATUS FOR ESTIMATING CABLE LENGTH

(75) Inventors: Guan-Henry Lin, Taichung (TW); Tsung-Hsuan Wu, Changhua County (TW); Wen-Sheng Hou, Hsinchu County (TW)

(73) Assignee: Ralink Technology, Corp., Jhubei, Hsinchu County (TW)

( * ) Notice: Subject to any disclaimer, the term of this patent is extended or adjusted under 35 U.S.C. 154(b) by 426 days.

(21) Appl. No.: 12/501,485

(22) Filed: Jul. 12, 2009

(65) Prior Publication Data

US 2010/0259244 A1 Oct. 14, 2010

(30) Foreign Application Priority Data

Apr. 10, 2009 (TW) .............................. 98112029 A

(51) Int. Cl.
*G01R 27/04* (2006.01)

(52) U.S. Cl. ....................................... 324/642; 324/644
(58) Field of Classification Search .......... 324/532–535, 324/642, 644
See application file for complete search history.

(56) References Cited

U.S. PATENT DOCUMENTS

| | | | | |
|---|---|---|---|---|
| 4,538,103 A | * | 8/1985 | Cappon | 324/534 |
| 4,766,386 A | * | 8/1988 | Oliver et al. | 324/533 |

* cited by examiner

*Primary Examiner* — Vincent Q Nguyen
(74) *Attorney, Agent, or Firm* — Winston Hsu; Scott Margo

(57) ABSTRACT

A method for estimating cable length includes steps of generating a detection signal to a cable, wherein the detection signal includes a first pulse and a second pulse with opposite voltages in sequence; receiving a refection signal of the detection signal from the cable; and determining length of the cable according to a superposed waveform of the detection signal and the refection signal.

21 Claims, 6 Drawing Sheets

METHOD AND APPARATUS FOR ESTIMATING CABLE LENGTH

BACKGROUND OF THE INVENTION

1. Field of the Invention

The present invention relates to a method and an apparatus for estimating a length of a cable, and more particularly to, a method and an apparatus for estimating a length of a cable in Ethernet.

2. Description of the Prior Art

Ethernet is standardized as IEEE 802.3. So far, it has been widely used in local area networks (LANs). In order to meet all kinds of requirements, Ethernet devices are connected by different network media such as twisted pair cables, coaxial cables, optical fibers and etc., to support the bit rates of 10 Mbps, 100 Mbps, and 1 Gbps.

As known so far, the Ethernet devices are connected by the twist pair cables, and support the bit rates of 10 Mbps and 100 Mbps. At the beginning of connection, two mutually connected Ethernet devices confirm their connection ability and data rate through a link pulse. For example, the connection can run at 100 Mbps only if both Ethernet devices support the bit rate of 100 Mbps. Otherwise, the lower bit rate, 10 Mbps, is adopted.

On the other hand, in order to reduce the power consumption in the network system, the prior art usually takes advantage of time domain reflectometry (TDR) to detect the length of the cable as a power reference of data transmission. Since impedance variance at the ends of the cable causes reflection of the input pulse, TDR can thus calculate the length of the cable or determine defect positions of the cable based on travel time and velocity of the reflection signal.

However, as known by those skilled in the art, if the cable is too short (i.e. the end of the cable is too close to the transmission terminal), the travel time of the reflection signal decreases dramatically, the reflection signal therefore overlaps with the incident signal. Thus, the reflection signal may not be distinguishable, resulting in blind spots on cable length detection. In this situation, the prior art usually narrows the pulse width of the incident signal for enhancing the resolution of the reflection signal.

Since narrowing the pulse width of the incident signal accompanies power reduction of the incident signal, it is possible that the prior art cannot detect the refection signal due to power attenuation when the end of the cable is far from the transmission terminal. In addition, the narrowed pulse signal no longer meets the Ethernet standards, and thus requires extra hardware to carry out.

SUMMARY OF THE INVENTION

It is therefore an objective of the present invention to provide a method and an apparatus for estimating a length of a cable.

The present invention discloses a method for estimating a length of a cable. The method includes steps of generating a detection signal to the cable, receiving a refection signal of the detection signal from the cable and determining the length of the cable according to a superposed waveform of the detection signal and the refection signal. The detection signal includes a first pulse and a second pulse with opposite voltage directions in sequence.

The present invention further discloses an estimation device for estimating a length of a cable. The estimation device includes a signal generator, a switching unit and an estimation unit. The signal generator is utilized for generating a detection signal to the cable. The detection signal includes a first pulse and a second pulse with opposite voltage directions in sequence. The switching unit is coupled to the signal generator, and utilized for receiving a refection signal of the detection signal from the cable. The estimation unit is coupled to the switching unit, and utilized for determining the length of the cable according to a superposed waveform of the detection signal and the refection signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
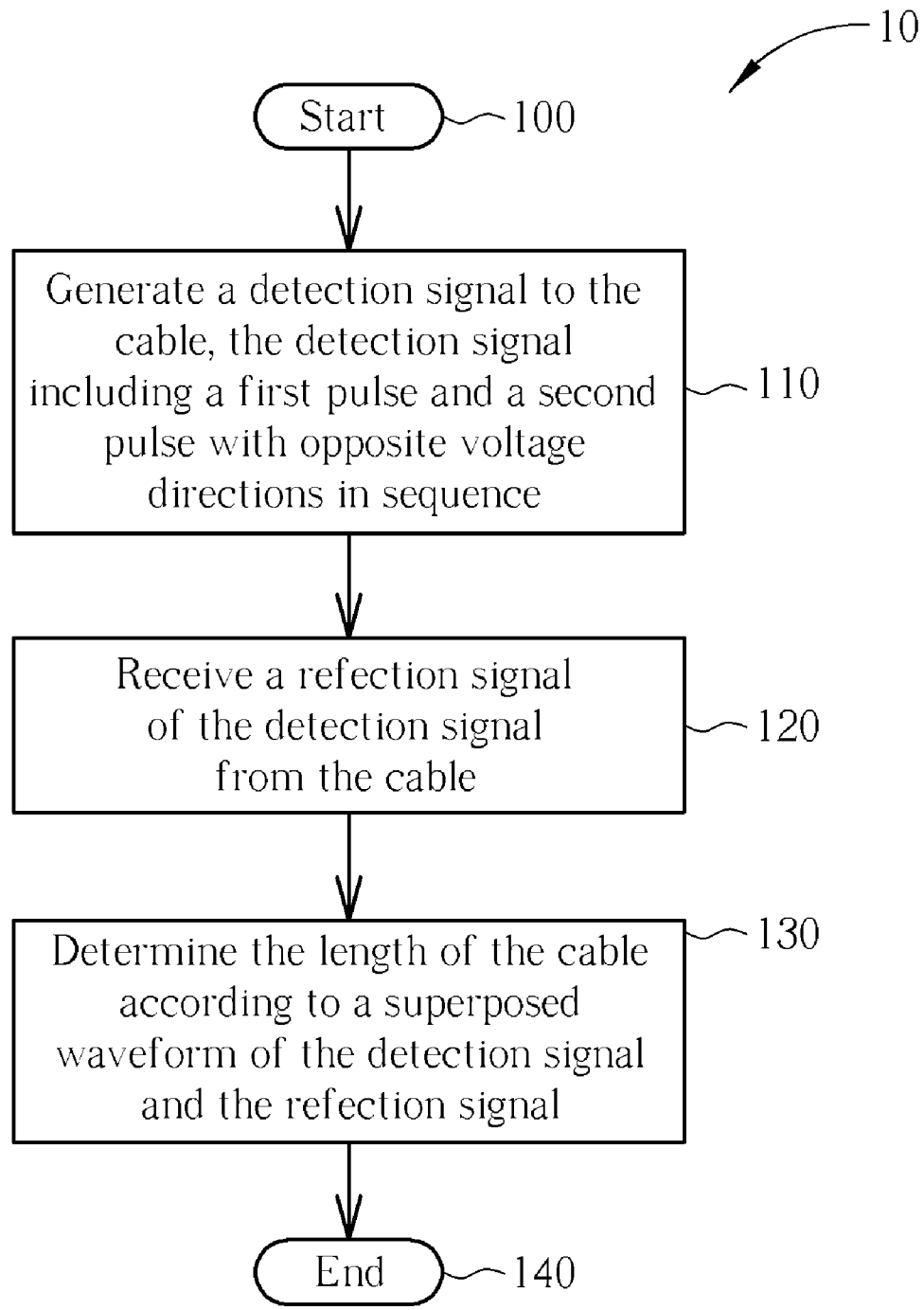
FIG. 1 is a flowchart of a process according to an embodiment of the present invention.

Please refer to FIG. 1, which is a flowchart of a process 10 according to an embodiment of the present invention. The process 10 is utilized for estimating a length of a cable and includes the following steps:

Step 100: Start.

Step 110: Generate a detection signal to the cable, the detection signal including a first pulse and a second pulse with opposite voltage directions in sequence.

Step 120: Receive a refection signal of the detection signal from the cable.

Step 130: Determine the length of the cable according to a superposed waveform of the detection signal and the refection signal.

Step 140: End.

According to the process 10, the embodiment of the present invention generates the detection signal to the cable. The detection signal includes the first pulse and the second pulse with opposite voltage directions in sequence. Then, the embodiment of the present invention receives the refection signal of the detection signal from the cable and determines the length of the cable according to the superposed waveform of the detection signal and the refection signal.

Preferably, the first pulse and the second pulse are a positive voltage pulse and a negative voltage pulse, respectively. A pulse width of the second pulse is less than a pulse width of the first pulse. In addiction, the detection signal mentioned above meets a link pulse template in an Ethernet standard. In this situation, amplitude of the second pulse approximates to a minimum voltage of the link pulse template.

Therefore, by generating the detection signal to the cable, the embodiment of the present invention can detect the length of the cable according to the superposed waveform of the detection signal and the reflection signal, so as to solve the blind spot problem in the prior art. Besides, since the detection signal meets the Ethernet link pulse template, the embodiment of the present invention needs no more extra hardware to generate the detection signal such that the cost of the hardware can be reduced. The detailed operations of the process 10 can be known by referring to the following statements.

Figure 2:
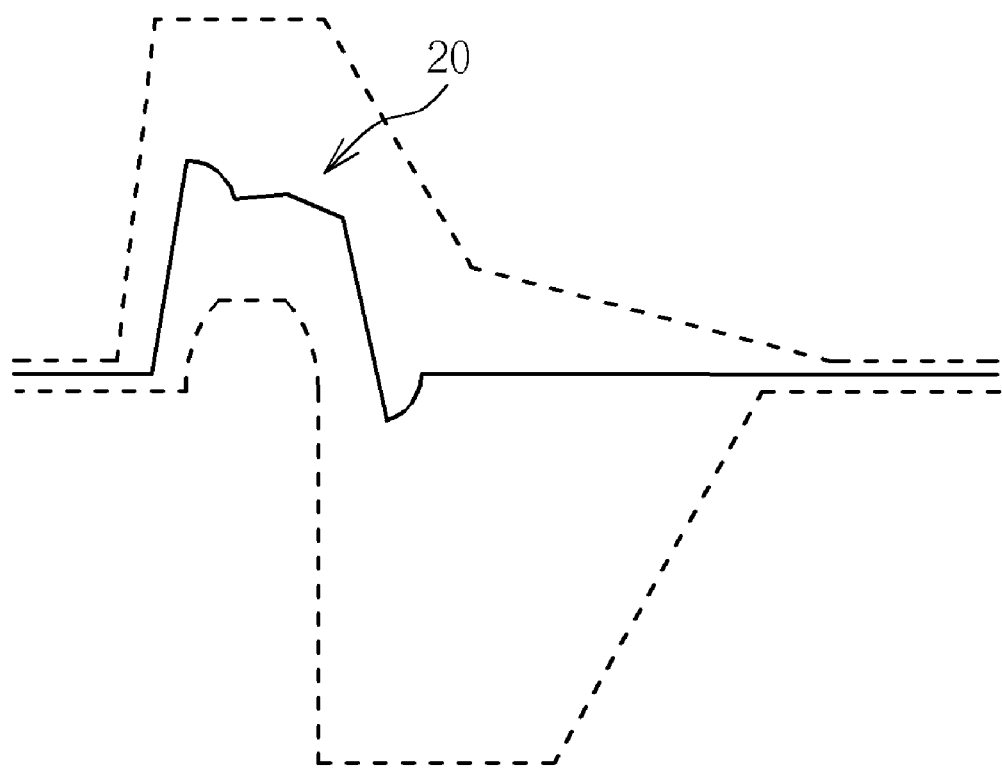
FIG. 2 is a waveform of a conventional link pulse signal.
Figure 3:
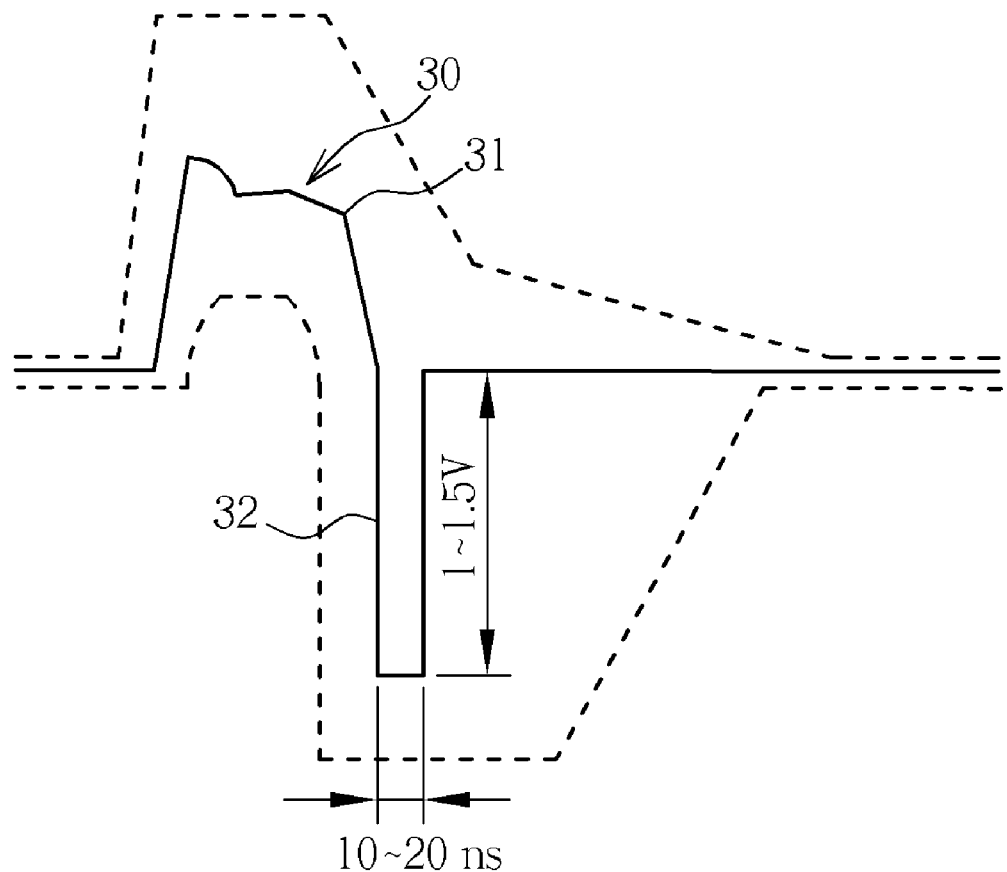
FIG. 3 is a waveform of a detection signal according to an embodiment of the present invention.

Please refer to FIG. 2 and FIG. 3. FIG. 2 is a waveform of a conventional link pulse signal 20, and FIG. 3 is a waveform of a detection signal 30 according to an embodiment of the present invention. In FIG. 2 and FIG. 3, the dashed line represents a link pulse template of the Ethernet standard, while the solid line represents the conventional link pulse signal 20 and the detection signal 30, respectively. The definition of the link pulse template can be found in the IEEE802.3 specification and thus not elaborated on herein. Please note that the negative pulse of the conventional link pulse 20 is an overshoot pulse, which is generated by accident. In contrast to the conventional link pulse 20, the detection signal 30 includes a positive voltage pulse 31 and a negative voltage pulse 32 in sequence. The pulse width of the negative pulse 32 provides one sampling point up to four sampling points at an Ethernet operating frequency (i.e. 10~20 ns), and the amplitude of the negative pulse 32 is about 1 to 2.5 volt. In this situation, the embodiment of the present invention can determine the length of the cable according to the superposed waveform of the detection signal 30 and the reflection signal, so as to solve the blind spot problem in the prior art.

Figure 4:
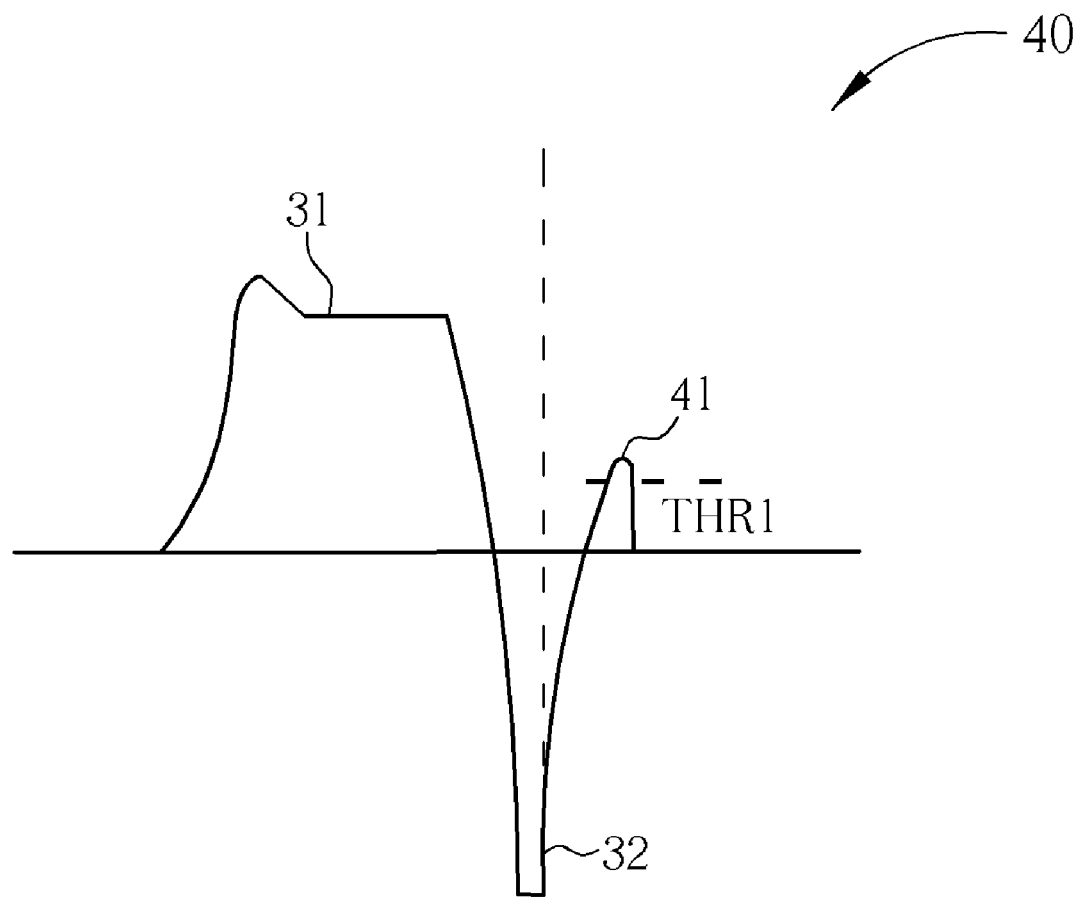
FIG. 4 is a schematic diagram of a superposed waveform of the detection signal and the reflection signal according to an embodiment of the present invention.

For example, please refer to FIG. 4, which is a schematic diagram of a superposed waveform 40 of the detection signal 30 and the reflection signal thereof according to an embodiment of the present invention. When the length of the cable is shorter than a first value, the reflection signal of the positive pulse 31 completely overlaps with the detection signal 30. Therefore, when the superposed waveform 40 is detected to have a positive pulse 41 (i.e. the reflection signal of the negative pulse 32) following the detection signal 30, the embodiment of the present invention determines the length of the cable is shorter than the first value, as shown in FIG. 4. Definitely, in order to avoid erroneous determination due to noise, the embodiment of the present invention can generate the determination result only if the amplitude of the positive pulse 41 is greater than a threshold value THR1.

Figure 5:
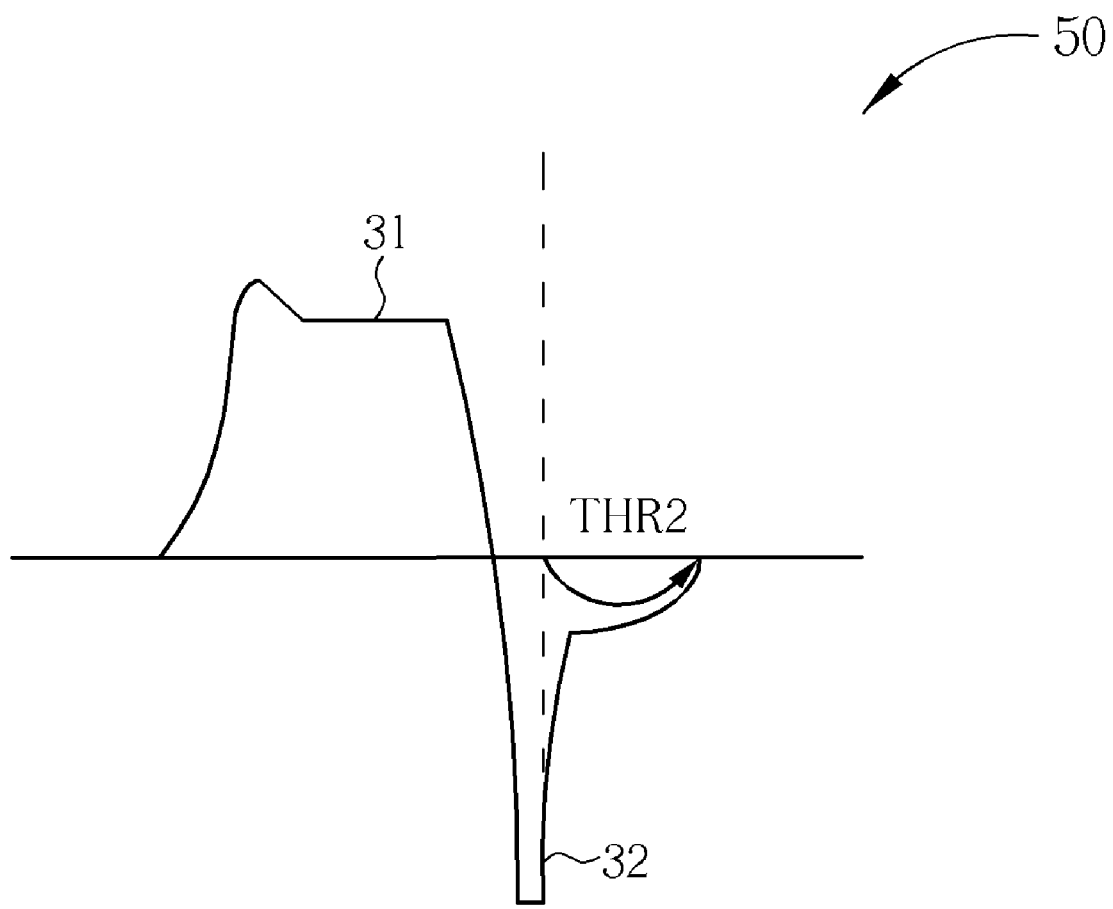
FIG. 5 is a schematic diagram of a superposed waveform of the detection signal and the reflection signal according to an embodiment of the present invention.

On the other hand, please refer to FIG. 5, which is a schematic diagram of a superposed waveform 50 of the detection signal 30 and the reflection signal thereof according to an embodiment of the present invention. When the length of the cable is longer than the first value but shorter than a second value, the reflection signal of the positive pulse 31 only overlaps with the negative pulse 32. Therefore, when detecting the pulse width of the negative pulse 32 in the superposed waveform increases (e.g. greater than a threshold value THR2), the embodiment of the present invention determines the length of the cable is between the first value and the second value, as shown in FIG. 5.

The first value and the second value are different for different types of the cables. Take an example of the twist pair cables, the first value is about eight meters and the second value is about sixteen meters. Consequently, the embodiment of the present invention can determine the length of the cable according to the superposed waveform of the detection signal 30 and its reflection signal to solve the blind spots in the prior art.

In addiction, when the length of the cable is longer than the second value, the embodiment of the present invention further determines the length of the cable according to travel time of the reflection signal. This is well known by those skilled in the art, and thus not elaborated on herein.

Figure 6:
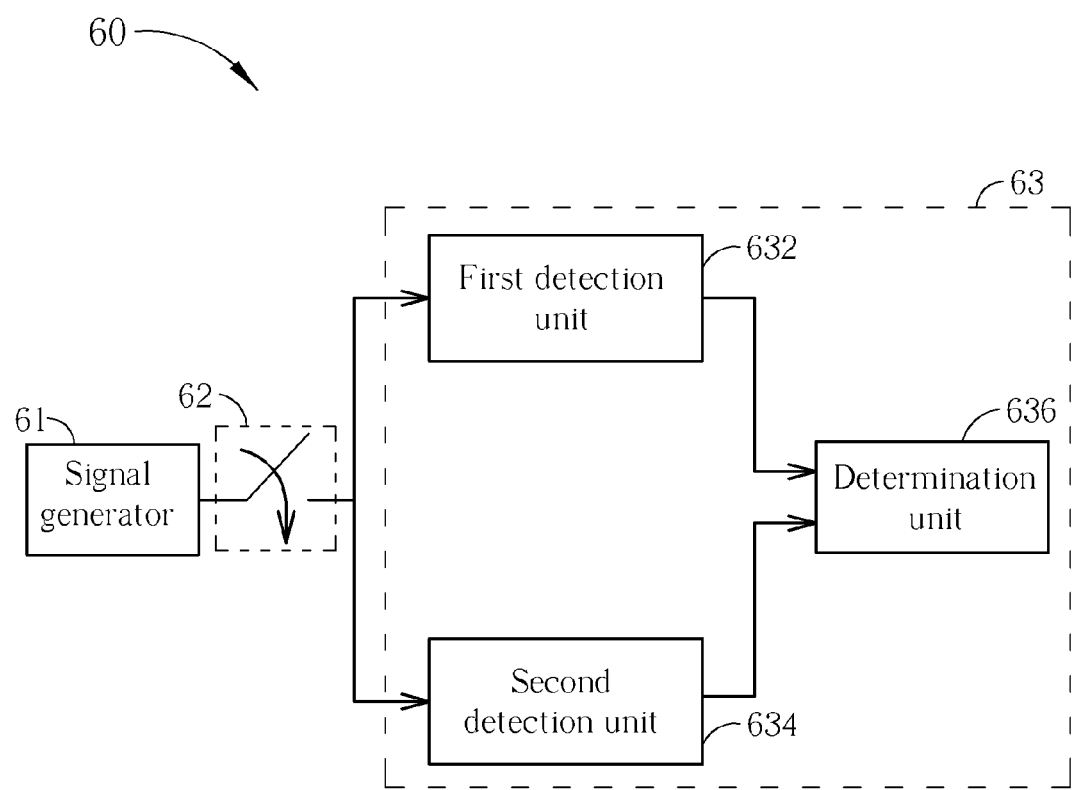
FIG. 6 is a schematic diagram of an estimation device according to an embodiment of the present invention.

Please continue to refer to FIG. 6, which is a schematic diagram of an estimation device 60 according to an embodiment of the present invention. The estimation device 60 is utilized for implementing the process 10 to estimate a length of a cable in Ethernet. The estimation device 60 includes a signal generator 61, a switching unit 62, and estimation unit 63. The signal generator 61 is utilized for generating the detection signal 30 to the cable. The switching unit 62 is coupled to the signal generator 61, and utilized for receiving a refection signal of the detection signal 30 from the cable. The estimation unit 63 is coupled to the switching unit 62, and utilized for determining the length of the cable according to a superposed waveform of the detection signal 30 and the refection signal thereof.

Preferably, the determination unit 30 further includes a first detection unit 632, a second detection unit 634, and a determination unit 636. The first detection unit 632 is utilized for detecting whether the superposed waveform has a positive pulse following the detection signal 30. The second detection unit 634 is utilized for detecting whether a pulse width of the negative pulse 32 in the superposed waveform increases. The determination unit 636 is utilized for determining the length of the cable according to detection results of the first detection unit 632 and the second detection unit 634.

As a result, the estimation device 60 can determine the length of the cable according to the superposed waveform of the detection signal 30 and its reflection signal to solve the blind spots in the prior art. The detailed operations of the estimation device 60 can be known by referring to the process 10 mentioned above, and thus is not elaborated on herein.

Certainly, not only is the detection signal 30 utilized for determining the length of the cable, but also it can be used as a link pulse for confirming the connection ability in the network. Please note that, in the embodiment of the present invention, the length of the cable represents either the length of the cable between two communication devices or the distance between the transmission terminal and the impedance mismatch points in the cable, such as broken points and defection points. Such variations are also included in the scope of the present invention.

To sum up, the embodiment of the present invention generates the detection signal having the particular waveform to the cable, and estimates the length of the cable according to the superposed waveform of the detection signal and the reflection signal. Such that the blind spots in the prior art can be solved. In addiction, since the detection signal meets the link pulse template in the Ethernet standard, the embodiment of the present invention does not need extra hardware for signal generation. Thus, the cost of the hardware can be reduced.

Those skilled in the art will readily observe that numerous modifications and alterations of the device and method may be made while retaining the teachings of the invention.

What is claimed is:

1. A method for estimating a length of a cable, the method comprising:
    generating a detection signal to the cable, the detection signal comprising a first pulse and a second pulse with opposite voltage directions in sequence;
    receiving a refection signal of the detection signal from the cable; and
    determining the length of the cable according to a superposed waveform of the detection signal and the refection signal.

2. The method of claim 1, wherein the first pulse is a positive voltage pulse, and the second pulse is a negative voltage pulse.

3. The method of claim 2, wherein a pulse width of the second pulse is less than a pulse width of the first pulse.

4. The method of claim 1, wherein the detection signal meets a link pulse template in an Ethernet standard.

5. The method of claim 4, wherein amplitude of the second pulse approximates to a minimum voltage of the link pulse template.

6. The method of claim 1, wherein the step of determining the length of the cable according to the superposed waveform of the detection signal and the refection signal comprises:
   determining the length of the cable is shorter than a first particular value when the superposed waveform has a third pulse following the detection signal, wherein the third pulse is a refection signal of the second pulse.

7. The method of claim 6, wherein amplitude of the third pulse is greater than a threshold value.

8. The method of claim 1, wherein the step of determining the length of the cable according to the superposed waveform of the detection signal and the refection signal comprises:
   determining the length of the cable is between a first particular value and a second particular value when a pulse width of the second pulse in the superposed waveform increases.

9. The method of claim 1, wherein a pulse width of the second pulse provides one sampling point up to four sampling points at an Ethernet operating frequency.

10. The method of claim 1 further comprising:
    determining the length of cable according to a travel time of the reflection signal.

11. An estimation device for estimating a length of a cable, the estimation device comprising:
    a signal generator for generating a detection signal to the cable, the detection signal comprising a first pulse and a second pulse with opposite voltage directions in sequence;
    a switching unit, coupled to the signal generator, for receiving a refection signal of the detection signal from the cable; and
    an estimation unit, coupled to the switching unit, for determining the length of the cable according to a superposed waveform of the detection signal and the refection signal.

12. The estimation device of claim 11, wherein the first pulse is a positive voltage pulse, and the second pulse is a negative voltage pulse.

13. The estimation device of claim 12, a pulse width of the second pulse is less than a pulse width of the first pulse.

14. The estimation device of claim 11, wherein the detection signal meets a link pulse template in an Ethernet standard.

15. The estimation device of claim 14, wherein amplitude of the second pulse approximates to a minimum voltage of the link pulse template.

16. The estimation device of claim 11, wherein the estimation unit comprises:
    a first detection unit for detecting whether the superposed waveform has a third pulse following the detection signal, wherein the third pulse is a refection signal of the second pulse;
    a second detection unit for detecting whether a pulse width of the second pulse in the superposed waveform increases; and
    a determination unit for determining the length of the cable according to detection results of the first detection unit and the second detection unit.

17. The estimation device of claim 16, wherein the determination unit determines the length of the cable is shorter than a first particular value when the superposed waveform has the third pulse following the detection signal.

18. The estimation device of claim 17, wherein amplitude of the third pulse is greater than a threshold value.

19. The estimation device of claim 16, wherein the determination unit determines the length of the cable is between a first particular vale and a second particular value when the pulse width of the second pulse in the superposed waveform increases.

20. The estimation device of claim 11, wherein a pulse width of the second pulse provides one sampling point up to four sampling points at an Ethernet operating frequency.

21. The estimation device of claim 11, wherein the estimation unit is further utilized for determining the length of cable according to a travel time of the reflection signal.

* * * * *